United States Patent [19]

Nguyen

[11] Patent Number: 5,478,005
[45] Date of Patent: Dec. 26, 1995

[54] APPARATUS AND METHOD FOR FLUXLESS SOLDERING

[75] Inventor: Hung N. Nguyen, Bensalem, Pa.

[73] Assignee: AT&T Corp., Murray Hill, N.J.

[21] Appl. No.: 267,053

[22] Filed: Jun. 27, 1994

[51] Int. Cl.⁶ .............................. B23K 1/00; H01L 21/50
[52] U.S. Cl. ..................... 228/123.1; 228/234.1; 228/124.1
[58] Field of Search .............................. 228/122.1, 123.1, 228/124.1, 219, 234.1, 256, 20.1, 42

[56] References Cited

U.S. PATENT DOCUMENTS

| | | | |
|---|---|---|---|
| 3,603,329 | 11/1968 | White et al. | 228/20.1 |
| 3,653,572 | 4/1972 | Dushkes et al. | 228/20.1 |
| 5,220,147 | 6/1993 | Spigarelli et al. | 228/20.1 |

OTHER PUBLICATIONS

IBM Technical Disclosure Bulletin, "Use of a Heated Gas Jet to Remove a Silicon Chip . . . ", pp. 3725, 3726, vol. 20, No. 9, Feb. 1978.

*Primary Examiner*—Samuel M. Heinrich

[57] ABSTRACT

For soldering together two surfaces of a workpiece by means of solder, and without the use of a solder flux, apparatus includes means for preheating the workpiece and solder to a temperature close to but less than the solder fusing temperature, and means for directing two jets of a hot, non-oxidizing gas towards the preform from opposite sides thereof and along a straight line axis. The hot gas melts the solder and causes flow of the melted solder between the two surfaces in directions generally transverse to the axis of the two gas jets.

6 Claims, 3 Drawing Sheets

5,478,005

APPARATUS AND METHOD FOR FLUXLESS SOLDERING

BACKGROUND OF THE INVENTION

This invention relates to soldering, and particularly to an apparatus and to a method for forming soldered joints without the use of a solder flux.

Soldering is an ancient art and, as well known, it is generally desirable to use certain agents, known as "fluxes," in the soldering process. Such fluxes attack and remove oxides initially coating the surfaces. Freshly cleaned surfaces are thereby prepared for contact by the molten solder, whereby better wetting and adhesion of the solder to the surfaces occurs. Also, the molten solder better flows over the surfaces for uniformly spreading the solder over the surfaces being bonded.

There are, however, numerous instances where the use of solder fluxes is impractical. In photonic devices, for example, an exposed surface is present which serves as a mirror for the light to be emitted. During soldering, such exposed surface can be damaged by any exposure to the solder flux. Accordingly, for avoiding such damage, soldering in the manufacture of certain photonic devices, as well as other devices, particularly in the semiconductor device art, is done without the use of solder fluxes.

To this end, great care is taken to prevent contamination of the surfaces being soldered together whereby proper flow and full surface contacting by the molten solder is obtained without the use of a solder flux. While such fluxless soldering is generally possible, the soldering processes are somewhat "delicate" in that great care must be exercised, the processes used are generally relatively slow, and, not infrequently, poor solder joints result.

Analysis of fluxless soldering processes previously used reveals two principal problems.

In one prior art process, for example, a relatively large first part is to be soldered and the part is heated, prior to the application of solder, to a temperature in excess of the melting temperature of the solder to be used. A solder preform is then placed on the preheated part and a second part to be soldered to the first part is placed on the solder preform. Owing to the high temperature of the first part, the solder melts and flows to form the solder joint. However, while the solder immediately begins to melt when it is placed on the preheated part, there is a tendency for oxides to form on the solder. To the extent that such oxides are formed (which oxides are not removed in the absence of a solder flux), proper wetting of the solder with the surfaces is impaired and poor soldering results.

Another problem is that with various combinations of materials, e.g., a gold surface to be soldered using a lead-tin or gold-tin solder, the molten solder reacts with the material of the surface and becomes, rather than a relatively free flowing liquid, a highly viscous, poor flowing paste. Thus, the solder does not properly spread across the surfaces being soldered and defective soldered joints result.

SUMMARY OF THE INVENTION

Apparatus for soldering together two surfaces by means of solder disposed therebetween comprises a work station for receipt of a workpiece to be soldered, a source of a heated, non-oxidizing gas, and means for directing a jet of the heated gas towards the workpiece for rapidly heating the solder to its fusing temperature and for forcibly spreading the molten solder between the two surfaces. Preferably, the apparatus includes means for preheating the workpiece to a temperature less than the solder fusing temperature prior to directing the gas jet against the workpiece, and the gas directing means comprises a generally C-shaped nozzle including two spaced apart open ends facing towards one another and disposed on opposite sides of the workstation for directing two gas jets at opposite sides of the workpiece.

A method of soldering together two surfaces of a workpiece by means of a body of solder disposed between the surfaces comprises heating a non-oxidizing gas to a temperature in excess of the melting temperature of the solder, and directing a jet of the heated gas against the workpiece and directly against the solder body for melting the solder and forcing the molten solder in a direction transverse to the direction of the gas jet for spreading the solder between the two surfaces. Preferably, two jets of hot gas are directed towards one another and against opposite sides of the workpiece.

DESCRIPTION OF PREFERRED EMBODIMENTS

Figure 1:
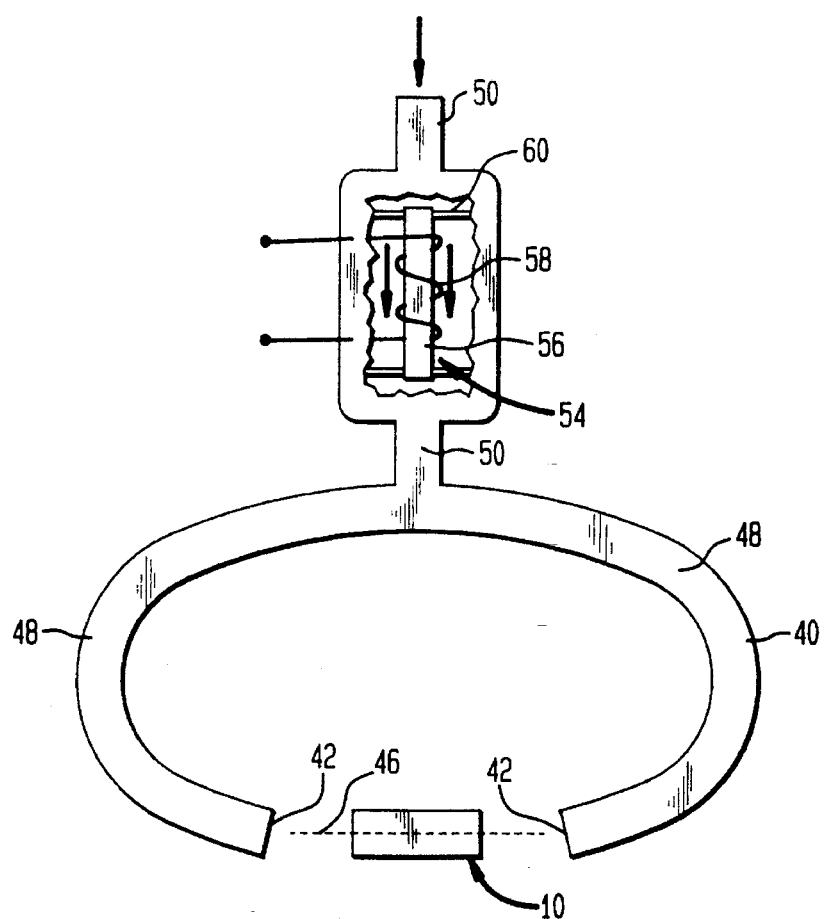
FIG. 1 is a plan view of an apparatus according to the present invention.
Figure 2:
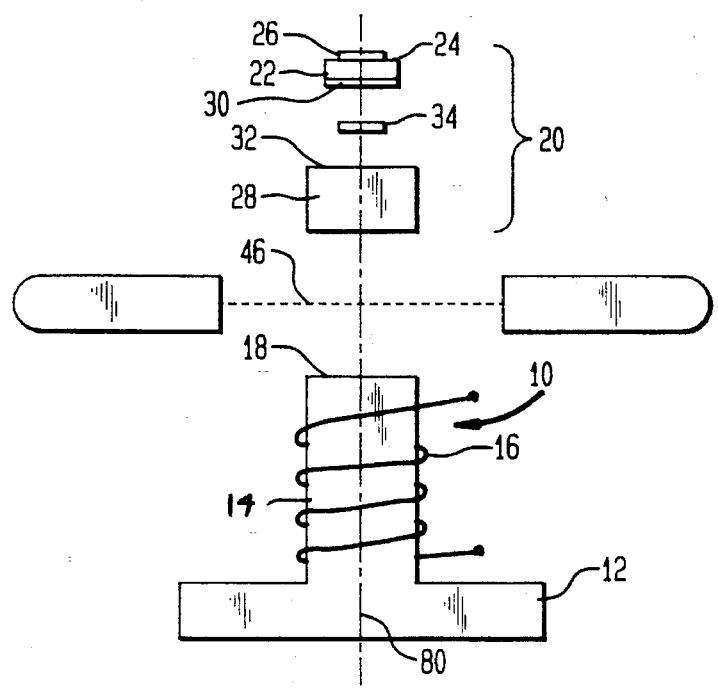
FIG. 2 is a side elevation of the apparatus shown in FIG. 1 and showing a workpiece (exploded) to be soldered according to the invention.

An apparatus according to the invention is shown in FIGS. 1 and 2. The apparatus includes a workstation 10 comprising a workpiece supporting member 12 including a vertical column 14 of metal having, in this embodiment of the invention, an electrical heating coil 16 wound there around. The vertical column has an upper surface 18 on which a workpiece to be soldered is disposed.

By way of example, the workpiece 20 (shown exploded in FIG. 2) comprises a substrate 22 of silicon having an upper surface 24 on which is bonded (in a previous process) a semiconductor chip 26. The substrate 22 is to be bonded to a mounting stud 28 of beryllium oxide and, to this end, the underside of the substrate is coated with a layer 30 of gold. For soldering the gold layer 30 to the upper surface 32 of the stud 28, a solder preform 34 is used.

Figure 3:
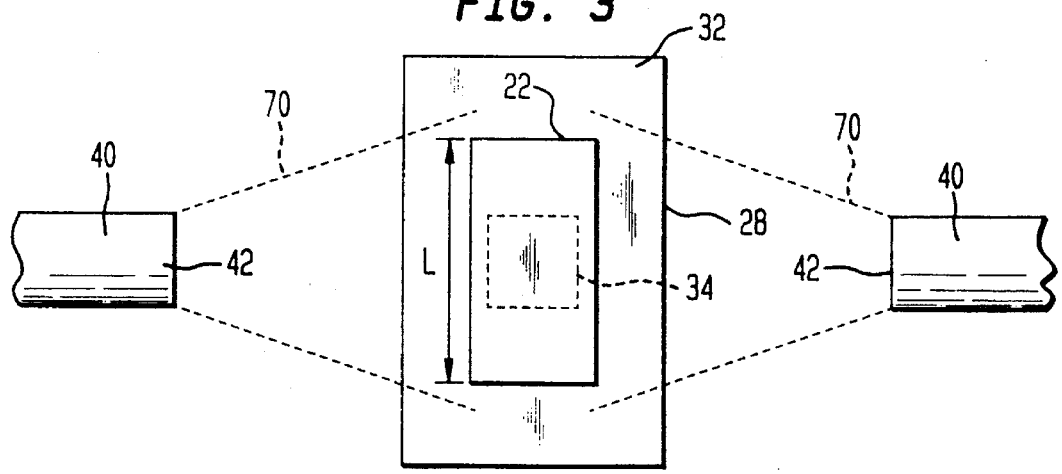
FIG. 3 is a plan view of a portion of the apparatus shown in FIG. 1 but on an enlarged scale and showing a portion of the workpiece shown in FIG. 2.
Figure 4:
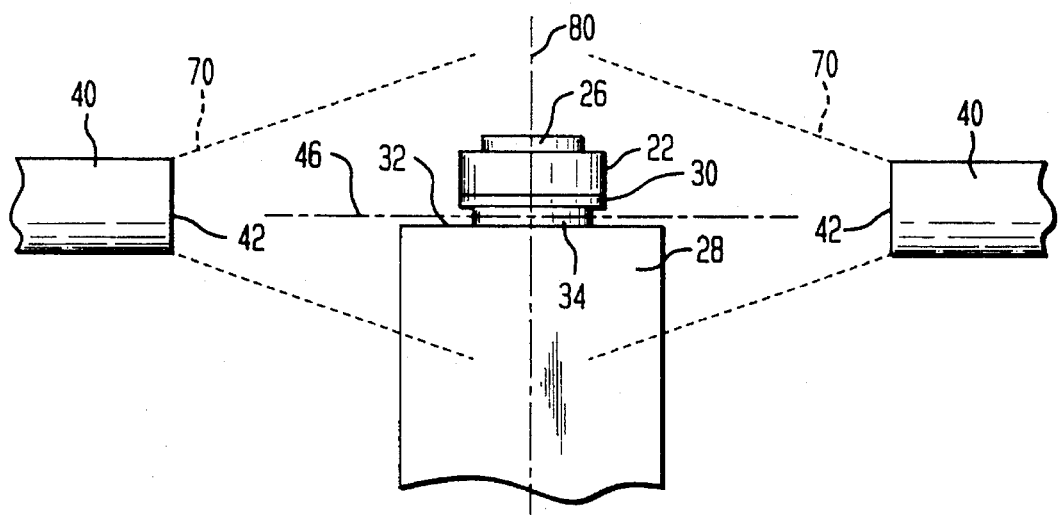
FIG. 4 is a side elevation of the apparatus shown in FIG. 3.

As shown in FIGS. 3 and 4, the top surface 32 of the stud 28 is larger than the bottom surface of the gold layer 30 on the substrate 22, and the solder preform 34 is smaller, in lateral extent, than the gold layer 30. In the soldering process, it is desired that the solder preform 34 melt and spread uniformly across the entire surface of the gold layer 30. Full surface contact is desired because the solder joint is in the path for heat conduction from the chip in the semiconductor device in which the chip is to be used, and the thermal conductance of the solder joint is directly proportional to the joint cross-sectional area.

Returning to the description of the apparatus, a gas jet forming means is provided comprising (FIG. 1) a generally C-shaped member 40 formed from hollow metal tubing and having two open ends 42 defining the gap in the "C". The two open ends 42 comprise gas jet nozzles which are disposed on either side of the workstation 10 and which point directly towards one-another along an axis 46 passing through the workstation.

The two sides 48 of the C-shaped member 40 join at a hollow metal tubing 50 communicating with both sides 48 of the member 40. Disposed axially within the tubing 50 is a heating element 54 comprising a solid, ceramic core 56 having an electrical resistance coil 58 wound thereabout. The heating element 54 is spaced from the wall of the tubing 50 by radially extending rods 60 or the like whereby an annular space is provided around the heating element 54 and between it and the tubing wall. Ends of the electrical resistance coil 58 extend through the tubing wall, whereby electrical power can be applied to the coil 58. In use, a non-oxidizing gas, e.g., pure nitrogen, a known reducing gas, or the like, is passed thorough the tubing and along the sides of the heating element 54 which heats the gas. The heated gas flows into the two hollow sides 48 of the C-shaped member 40 and emerges from the two nozzles 44.

The open ends of the nozzles 42 are circular or oval and, as shown in FIGS. 3 and 4, each nozzle 42 emits a conical gas jet 70 which is directed towards a respective side of the workstation. In the present embodiment, the sides of the jet streams diverge at an angle of about 7 degrees, and the jet streams have a cross-sectional area sufficient to fully encompass the various parts which are to form the soldered joint. Thus, each jet stream 70 has a diameter at least equal to the length L (FIG. 3) of the substrate 22. With the particular workpiece illustrated, the gas jets 70 encompass not only the full thickness of the solder preform 34 but the entire thickness of the chip 26 and the substrate 22 as well as a substantial portion of the stud 28.

What is actually critical is that the two gas jets 70 fully encompass not only the solder preform and the adjoining part surfaces to be soldered together, but sufficient adjoining portions of the workpiece to ensure a generally uniform heating of the parts to be soldered and a reactively small thermal gradient in directions away from the parts to be soldered. The actual heating profiles needed are a function of the particular workpiece being soldered. The heating profiles, however, are not critical, and persons of skill in the soldering arts can readily select the necessary healing parameters.

By way of example, the substrate 22 on which the chip 26 is mounted has a thickness of 4 mils, a length L, (FIG. 3) of 50 mils, and a width of 25 mils. The gold layer 30 covers the entire bottom surface of the substrate 22 and has a thickness of 2 micrometers. The solder preform 34 is a known lead-tin solder (60% lead, 40% tin, by weight) having a fusing temperature of 183 degrees C. The preform has a thickness of 1 mil, a length of 30 mils, and a width of 30 mils. The mounting stud 28 has a length of 150 mils, a width of 50 mils, and a thickness of 1 cm. Other solders can be used, e.g., a known 80% gold-20% tin solder having a fusing temperature of 310 degrees C.

Each nozzle opening 42 has a diameter of 60 mils, and is spaced from a central vertical axis 80 (FIG. 3) of the workstation a distance of 50 mils. In use of the apparatus, the C-shaped member 40 is disposed in a horizontal plane, and the horizontal axis 46 through the two nozzles 42 passes through the preform 34. As indicated in FIGS. 3 and 4, the gas jets 70 completely envelope the substrate 22 and the chip 26 thereon, the preform 34, and about 40 mils of the upper length of the mounting staid 28.

Known means, not shown, are provided for turning on and off the gas flow into and through the elongated tubing 50 (FIG. 1), and, with use of the 60% lead, 40% tin solder described, the gas is heated so that the temperature of the gas where it first exits the nozzles 42 is around 240 degrees C. (With the aforementioned 80% gold, 20% tin solder, the gas is heated to around 350 degrees C.). As previously noted, the two gas jets 70 are centered on the preform 34 and, with the described workpiece and nozzle parameters, each gas jet flows at a rate of about 20 cubic feet per hour.

The inventive process, utilizing the illustrated apparatus, is now described.

One part of the workpiece to be soldered, the mounting stud 28 in this embodiment, is first placed on the surface 18 (FIG. 2) of the heating column 14. The heating element 16 on the column is energized and the mounting stud 28 is heated (i.e., "preheated") to a temperature close to but less than the fusing temperature of the solder to be used. The preheating temperature is not critical but preferably should be as high as possible while still being less than the fusing temperature of the solder and less than the temperature at which oxides of the solder begin to rapidly form. With the aforementioned lead-tin solder, the mounting stud 28 is preheated to a temperature of around 175 degrees C.

With different solders, different temperatures are used. For example, using a 80% gold-20% tin solder, having a fusing temperature of 310 degrees C., the mounting stud 28 is preheated to a temperature of around 300 degrees C.

When the preheating temperature has been reacted, a solder preform 34 is placed on the upper surface 32 of the stud 28. Positioning of the preform is not critical provided it is generally centered on the surface 32.

Of importance, in comparison with the previously described prior an fluxless soldering process, is that while the preform 34 rapidly heats to the preheating temperature, the preform does not melt and retains its original shape. Also, little oxidation of the solder occurs. Accordingly, there is no special urgency to the next step of adding the chip 26—substrate 22 sub-assembly to the workpiece. Conversely, in the prior process, owing to the high preheating temperature used, that is, a temperature higher than the fusing temperature of the solder, the solder preform immediately begins to melt and oxides immediately begin to form. Thus, in the prior art process, it is critical that the chip sub-assembly be immediately added, to the workpiece, and any inadvertent or accidental delay can result in defective joints.

Having provided the preform 34 on the preheated stud 28, the chip sub-assembly 22,26 is then added. As noted, the prefom 34 is still solid at this time and provides a firm support for proper centering of the sub-assembly on the preform and on the mounting stud 28.

Then, a non-oxidizing gas is admitted into the tubing 50, heated therein to a temperature (e.g., the aforementioned 240 degrees C.) in excess of the lead-tin solder fusing temperature, and discharged as two hot gas jets 70 from the nozzles 42.

The hot gas jets perform three functions.

One, they rapidly heat the solder preform 34 and the adjoining parts of the workpiece to a temperature in excess of the solder fusing temperature. The solder thus melts and spreads between the surfaces to be soldered together.

The second function is that the non-oxidizing gas completely envelopes the solder and the surfaces being contacted thereby and provides a protective, oxygen free environment for the soldering process. Thus, the formation of oxides on the heated surfaces is greatly inhibited.

The third function is that the two gas jets 70 push upon the molten solder and cause spreading of the solder in directions generally transverse to the directions of flow of the gas jets 70.

As previously noted, various solders react with various surfaces being soldered and, in particular, both the lead in a lead-tin solder and the gold in a gold-tin solder react with the gold of the layer 30 (FIG. 2) on the lower surface of the substrate 22. The result of such reaction is that the molten solder is more paste-like than liquid, and has a high viscosity. Thus, even with the advantage of the avoidance of oxides on We heated surfaces, the molten solder tends not to flow and not to fully spread and cover the surfaces being bonded. Adequate flow is obtained, however, with the aid of the two gas jets 70.

Figure 5:
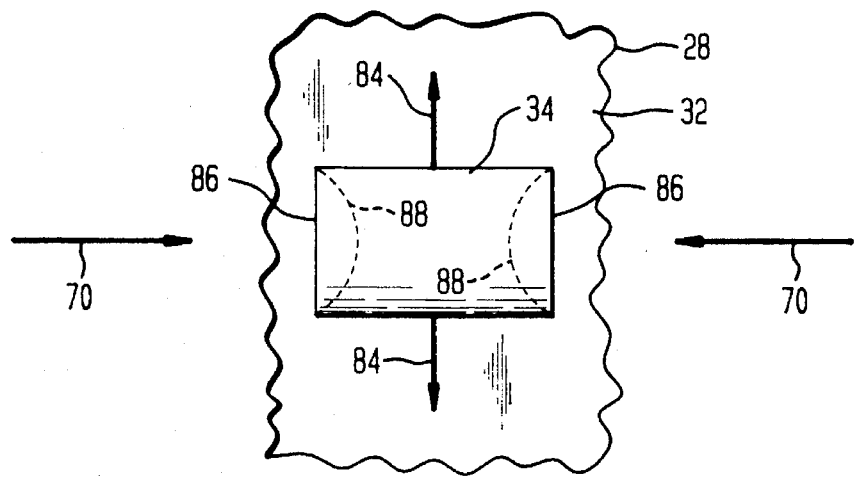
FIG. 5 is a schematic view, on an enlarged scale, illustrating the effect of the gas jets on a mass of molten solder.

As indicated in FIG. 5, the two oppositely directed gas jets 70 tend to squeeze the molten solder 34 and to force movement thereof in directions perpendicular to the direction of squeezing. Of importance is that the lateral flow of the solder (indicated by the arrows 84 in FIG. 5) occurs from internal portions of the solder mass. That is, where the surfaces of the molten solder initially contact and wet the underlying surface 32 of the mounting stud 28 (as well as the overlying surface 30 of the substrate 24, not shown in FIG. 5) the solder stays in place notwithstanding the pushing force provided by the gas jets 70. Thus, while there is some tendency for the sides 86 of the solder mass 34 to bulge inwardly, as shown by the dashed lines 86 in FIG. 5, the solder mass remains fully in contact with the adjoining surfaces, as indicated by the solid side lines 88 in FIG. 5, and once the jets are turned off, the solder immediately flows back to eliminate the temporary bulges.

Figure 6:
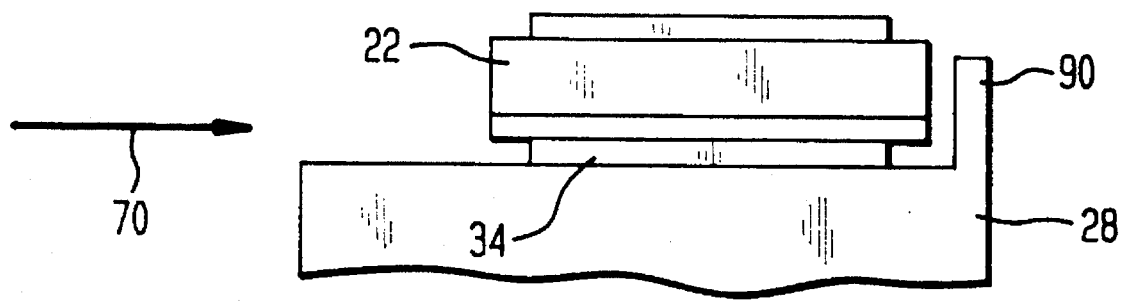
FIG. 6 is a side elevation of a modified workpiece.

As described, two oppositely directed jets 70 are used for squeezing and flowing the molten solder. However, if a solder dam is provided, e.g., (FIG. 6) by an upwardly extending wall 90 (FIG. 6) provided as an extension of the mounting stud 28 (or the workstation column 14), only a single gas jet 70 is required. In such case, the molten solder 34 is first forced towards and against the dam 90 and then squeezed laterally along the dam surface.

Figure 7:
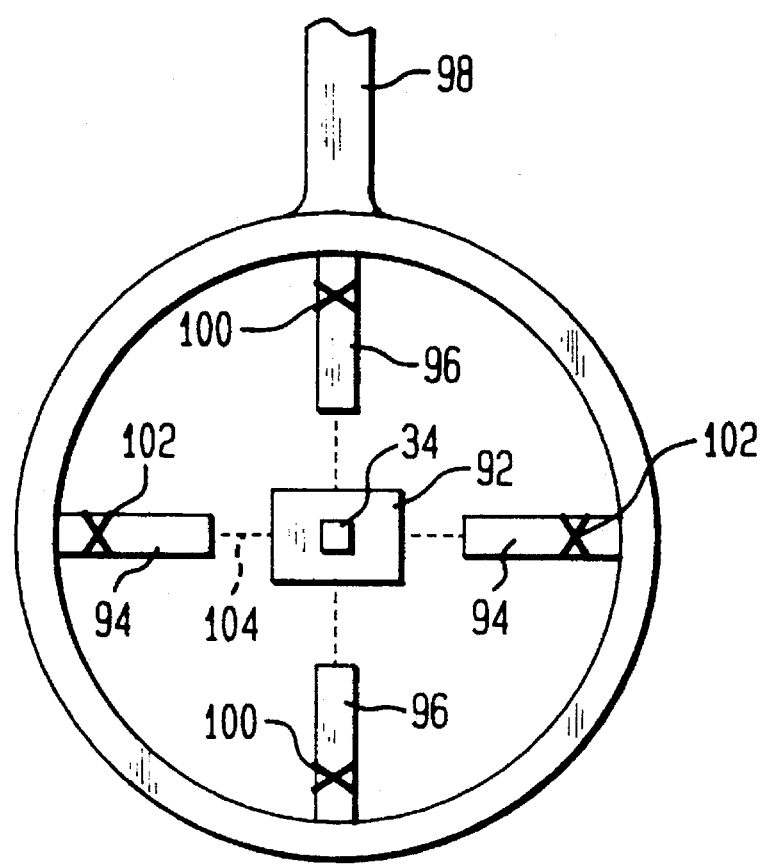
FIG. 7 is a plan view of another embodiment of the invention.

As shown in FIG. 3, the solder preform 34 has a width substantially equal to the width of the surface of the substrate 22, and spreading of the solder is required only along the length directions of the substrate 22. FIG. 7 shows a situation where a solder preform 34 is smaller both in length and width than a contacting surface 92 to be soldered, and flow of the molten solder is required in all lateral directions. This is accomplished using two pairs of nozzles 94 and 96.

As illustrated, all four nozzles can be supplied with heated gas from a common source 98, but separate value means 100 and 102 are provided for each nozzle pair.

In use of the four nozzles, one of the nozzle pairs, e.g., the left-to-right aligned pair 94, is used exactly as previously described for melting the preform 34 and causing spreading of the molten solder in directions perpendicular to the left-to-right axis 104. At this time, the top-to-bottom aligned nozzles 96 are valved in the off-condition.

Then, the nozzle pair 94 is valved off, and the nozzle pair 96 is valved on to produce hot gas jets along the top-to-bottom axis. The mass of molten solder is then elongated along the left-to-right direction 104. As previously explained, while a pair of jets cause temporary bulges in the sides of the molten solder mass against which the jets are directed, the jets do not move the solder away from surface areas already wet by the solder. Thus, the four jets spread the solder fully over the surface 92.

What is claimed is:

1. A method of soldering comprising disposing a body of solder between two surfaces to be soldered together, heating a non-oxidizing gas to a temperature in excess of the fusing temperature of the solder, and directing a first jet of said heated gas along a first direction directly against a first side of said solder body for melting said body and for forcibly flowing the melted solder in a second direction generally transverse to said first direction.

2. A method according to claim 1 including directing a second jet of said heated gas along a third direction directly opposite to said first direction and directly against a second side of said body opposite to said first side thereof.

3. A method according to claim 2 wherein said first and second jets are simultaneously directed against said body.

4. A method according to claim 3 including simultaneously directing third and fourth jets of a heated, non-oxidizing gas along fourth and fifth directions directly opposite to one another and generally parallel to said second direction and against respective third and fourth oppositely disposed sides of said melted solder in directions generally transverse to said fourth and fifth directions.

5. A method according to claim 4 including discontinuing said first and second jets and, thereafter directing said third and fourth jets against said molten solder.

6. A method according to claim 1 including, prior to disposing said solder body between said two surfaces, heating one of said surfaces to a temperature close to but less than said fusing temperature.

\* \* \* \* \*